(12) United States Patent
    Tamura

(10) Patent No.: US 9,930,209 B2
(45) Date of Patent: Mar. 27, 2018

(54) DEVICE, INFORMATION PROCESSING METHOD, AND INFORMATION PROCESSING SYSTEM

(71) Applicant: Shingo Tamura, Kanagawa (JP)

(72) Inventor: Shingo Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/456,725

(22) Filed: Mar. 13, 2017

(65) Prior Publication Data

US 2017/0272607 A1    Sep. 21, 2017

(30) Foreign Application Priority Data

Mar. 16, 2016  (JP) .................................. 2016-052930

(51) Int. Cl.
    *H04N 1/327* (2006.01)
    *H04N 1/00* (2006.01)
    (Continued)

(52) U.S. Cl.
    CPC ..... *H04N 1/32771* (2013.01); *H04N 1/00344* (2013.01); *H04N 1/00464* (2013.01);
    (Continued)

(58) Field of Classification Search
    CPC ............. H04N 1/32771; H04N 1/4433; H04N 1/00344; H04N 1/00464; H04N 1/32037;
    (Continued)

(56) References Cited

U.S. PATENT DOCUMENTS

| 8,693,018 B2* | 4/2014 | Ito ........................ G06K 15/005 |
| | | 358/1.13 |
| 2005/0057771 A1* | 3/2005 | Ohishi ............... H04N 1/00204 |
| | | 358/1.15 |

(Continued)

FOREIGN PATENT DOCUMENTS

| JP | 2010-026889 | 2/2010 |
| JP | 2010-128802 | 6/2010 |

(Continued)

*Primary Examiner* — Allen H Nguyen
(74) *Attorney, Agent, or Firm* — Harness, Dickey & Pierce, P.L.C.

(57) ABSTRACT

A device includes a first requester, an acquirer, a transmitter, a storage controller, a second requester, and an executor. The first requester is configured to issue a request for launching a program to a server. The acquirer is configured to acquire identifying information from the server in response to the launching request and identifies the program. The transmitter is configured to transmit device information that identifies the device to the server in response to a transmission request transmitted from the server. The storage controller is configured to store, in association with the identifying information, request information which allows accessing the server and the device information in a storage unit. The second requester is configured to transmit the request information to the server. The executor is configured to execute the program which is launched in the server and associated with the request information.

15 Claims, 7 Drawing Sheets

(51) Int. Cl.
*H04N 1/32* (2006.01)
*H04N 1/44* (2006.01)

(52) U.S. Cl.
CPC ....... *H04N 1/32037* (2013.01); *H04N 1/4433* (2013.01); *H04N 2201/0094* (2013.01); *H04N 2201/3205* (2013.01); *H04N 2201/3276* (2013.01)

(58) Field of Classification Search
CPC ... H04N 2201/0094; H04N 2201/3205; H04N 2201/3276
USPC ....................................................... 358/1.14
See application file for complete search history.

(56) References Cited

U.S. PATENT DOCUMENTS

| | | | |
|---|---|---|---|
| 2010/0131595 A1 | 5/2010 | Sugasaki | |
| 2011/0016464 A1 | 1/2011 | Tamura et al. | |
| 2011/0161652 A1 | 6/2011 | Ogura et al. | |
| 2011/0295970 A1* | 12/2011 | Miyazawa | G06F 9/5055 709/217 |
| 2014/0218762 A1* | 8/2014 | Abe | G06K 15/1803 358/1.15 |
| 2016/0004628 A1* | 1/2016 | Gugri | G06F 11/3688 717/124 |

FOREIGN PATENT DOCUMENTS

| | | |
|---|---|---|
| JP | 4790043 | 7/2011 |
| JP | 2016-177695 | 10/2016 |

\* cited by examiner

FIG.4A

| APPLICATION ID | URL | ITEM | VALUE |
|---|---|---|---|
| A0000001 | http://domain/path | SERIAL NUMBER | M0001 |
| | | DISPLAY LANGUAGE | JAPANESE |
| | | USER ID | UR0001 |
| | | MODEL NAME | S-Type |
| A0000002 | ... | ... | ... |
| ... | ... | ... | ... |

FIG.4B

| APPLICATION ID | APPLICATION NAME |
|---|---|
| A0000001 | WebApplication 1 |
| A0000002 | WebApplication 2 |
| A0000003 | WebApplication 3 |
| ... | ... |

DEVICE, INFORMATION PROCESSING METHOD, AND INFORMATION PROCESSING SYSTEM

CROSS-REFERENCE TO RELATED APPLICATIONS

The present application claims priority under 35 U.S.C. § 119 to Japanese Patent Application No. 2016-052930, filed Mar. 16, 2016. The contents of which are incorporated herein by reference in their entirety.

BACKGROUND OF THE INVENTION

1. Field of the Invention

The present invention relates to a device, an information processing method, and an information processing system.

2. Description of the Related Art

At present age, a single body device such as a copying device, a printing device, a facsimile device, and a scanner device has been known. Besides, a multifunction peripheral (MFP) including at least two image forming functions among a copying function, a printing function, a facsimile function, and a scanner function has also been known. With the recent advance in network technology, Web applications with which an information processing is performed in a server device on a predetermined network such as the Internet and a result of the information processing is returned to a user agent such as a Web browser of a client terminal have been growing. Here, the term "Web" is an abbreviation for "World Wide Web".

A WebAPI (Web Application Programming Interface) that allows using the functions and changing settings of an MFP has been disclosed. It is possible to give an instruction for printing and to change settings from an HTML (HyperText Markup Language) screen to be displayed by the WebAPI via a Web browser of the MFP.

Here, when a user uses a Web application of an MFP, steps (operations) for usage by the user, including:
1. log-in to the MFP;
2. search and select a desired Web application from a menu;
3. give an instruction for activating the Web application; and
4. give an instruction for executing a job such as printing, scanning, and the like, are required.

Among those steps for usage, the step of "2. search and select a desired Web application from a menu" is a troublesome operation for the user. It is therefore demanded to automatically activate the Web application desired by the user (=the step of "3") after the step of "1. log-in to the MFP".

In realizing those operations in cooperation with the MFP and a Web server device, the operations are summarized as follows. First, the Web server device is accessed through a Web browser of the MFP. Next, the Web server device obtains, from the MFP, information necessary for selecting a Web application and building a screen, such as a user ID, a MFP serial number, and a language set in the MFP. The Web server device then automatically activates the Web application desired by the user based on the obtained information.

However, the operation of the automatic activation of the Web application desired by the user involves a problem of delaying, for the time required for a communication processing for obtaining the information of the MFP from the Web server device, for example, the time to the activation of the Web application desired by the user.

SUMMARY OF THE INVENTION

According to one aspect of the present invention, a device includes a first requester, an acquirer, a transmitter, a storage controller, a second requester, and an executor. The first requester is configured to issue a request for launching a desired program to a server in which programs are stored on a network. The acquirer is configured to acquire identifying information that is included in user authenticating information transmitted from the server in response to the launching request and identifies the desired program. The transmitter is configured to transmit device information that identifies the device to the server in response to a transmission request transmitted from the device in response to the launching request. The storage controller is configured to store, in association with the identifying information, request information including address information which allows accessing the server via the network and the device information transmitted to the server in a storage unit. The second requester is configured to transmit the request information to the server via the network. The executor is configured to execute the desired program which is launched in the server and associated with the request information via the network.

BRIEF DESCRIPTION OF THE DRAWINGS

FIGS. 4A and 4B illustrate examples of custom request information used in the information processing system according to the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
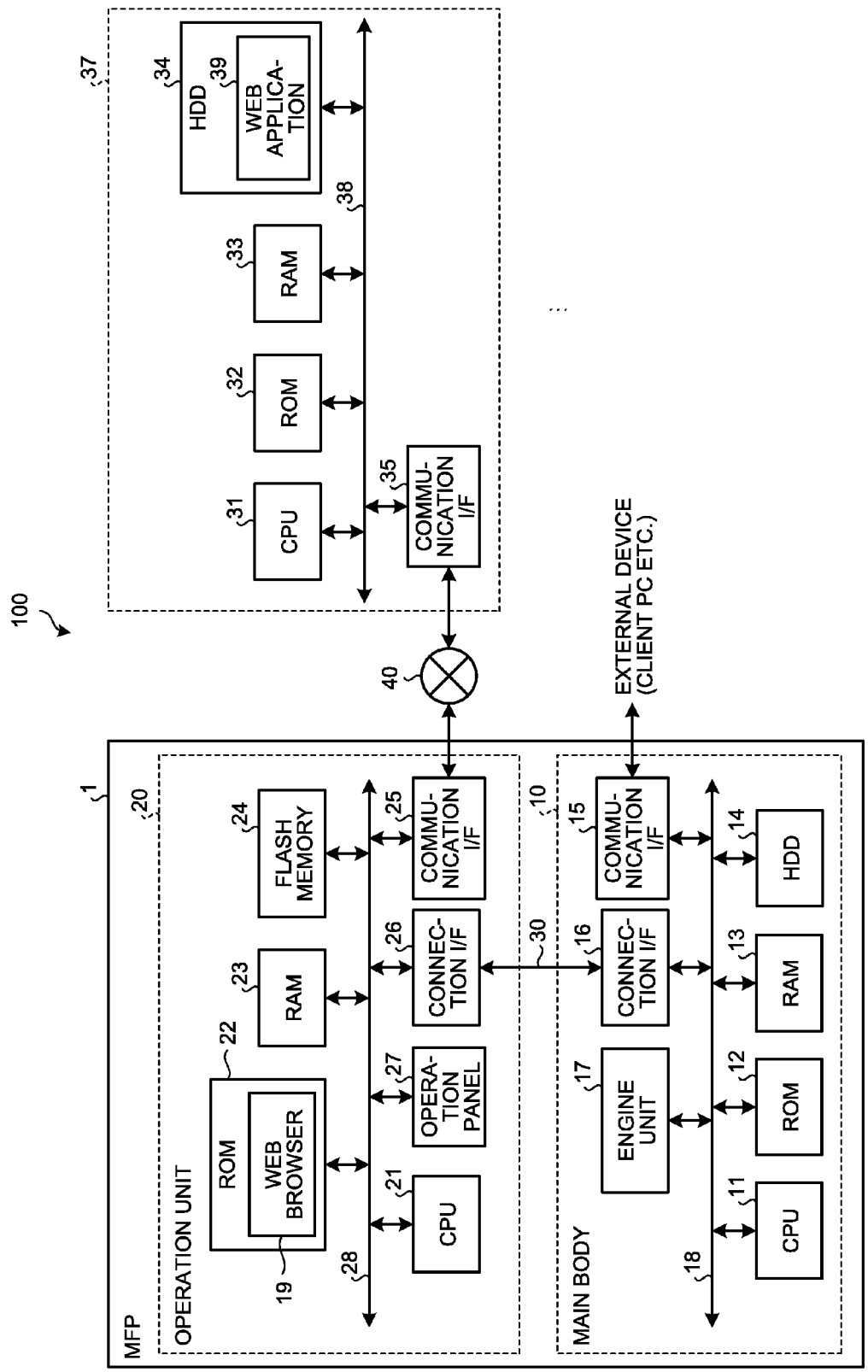
FIG. 1 illustrates a system configuration of an information processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a device, an image forming apparatus, an information processing method, a computer-readable recording medium, and an information processing system for information processing, capable of expediting an activation of a program desired by a user.

An exemplary embodiment of an information processing system to which the present invention is applied will be explained below as one example.

First, a system configuration of an information processing system 100 according to an embodiment is illustrated in FIG. 1. As illustrated in FIG. 1, an information processing system 100 according to the embodiment is provided with an MFP 1 as a multifunction peripheral and a Web server device 37. The MFP 1 and the Web server device 37 are connected mutually via a network 40 such as the Internet, for example. As illustrated in FIG. 1, the MFP 1 may be configured to be connected a plurality of Web server devices 37 via the network 40 in such a manner that the communication with them is enabled. In the explanation below, the MFP 1 will be explained on the assumption of being connected to a plurality of Web server devices 37.

The MFP 1 as an example of a device or an image forming apparatus is provided with a main body 10 including at least two functions among various kinds of functions including a copying function, a scanner function, a facsimile function, and a printing function and an operation unit 20 that receives an input appropriate to an operation by a user. The main body 10 and the operation unit 20 are mutually connected via a dedicated communication channel 30 in such a manner that a communication therebetween is enabled. While a USB (Universal Serial Bus) standard may be used for the communication channel 30, for example, any arbitrary standard may be used, irrespective of being wired or wireless. Besides, the main body 10 may include one function or a plurality of functions among image forming functions including the copying function, the scanner function, the facsimile function, and the printing function.

As the operation unit 20, an electronic device capable of independently executing a complete information processing can be used. As one example, an information processing terminal such as a smartphone or a tablet type terminal can be used as the operation unit 20. In this case, the information processing terminal used as the operation unit 20 functions as an operation unit of the MFP 1. Here, when the term "operation panel" is used simply below, it is assumed to indicate the conventional operation panel arranged by being fixed to the MFP 1.

More specifically, the information processing terminal used as the operation unit 20 is detachably connected to the MFP 1 instead of the operational panel conventionally arranged by being fixed as the operation unit dedicated to the MFP 1. In other words, the information processing terminal used as the operation unit 20 is arranged integrally with the MFP 1 while being detachable (separable) from a predetermined position such as a position where the operation panel of the MFP 1 is arranged. Therefore, the information processing terminal used as the operation unit 20 and the MFP 1 may be grasped as one device. The information processing terminal as the operation unit 20, for example, performs a wireless communication such as the Bluetooth® or the infrared communication with the MFP 1 when detached from the MFP 1 to function as the operation unit of the MFP 1.

The main body 10 performs an operation depending on the input received by the operation unit 20. The main body 10, which is cable of communicating with an external device such as a client PC (Personal Computer), also performs an operation depending on an instruction received from the external device.

A hardware configuration of the main body 10 will be explained next. As illustrated in FIG. 1, the main body 10 is provided with a CPU (Central Processing Unit) 11, a ROM (Read Only Memory) 12, a RAM (Random Access Memory) 13, and an HDD (Hard Disk Drive) 14. The main body 10 is also provided with a communication I/F (interface) 15, a connection I/F 16, and an engine unit 17. Those units 11 to 17 are connected to each other via a system bus 18.

The CPU 11 totally controls an operation of the main body 10. The CPU 11 uses the RAM 13 as a work area (work space) and executes programs stored in the ROM 12 or the HDD 14 to control the entire operation of the main body 10 and realize various functions including the copying function, the scanner function, the facsimile function, and the printing function. While the CPU 11 is configured to be provided with the HDD 14 here, the CPU 11 may be configured to be provided, as another auxiliary storage device, with an SSD (Solid State Drive) and the like instead of or in addition to the HDD 14.

The communication I/F 15 is an interface that enables a communication with the external device such as the client PC or the Web server device 37 on the network 40. The connection I/F 16 is an interface that enables a communication with the operation unit 20 via the communication channel 30. While the communication channel 30 is illustrated as a wired channel in FIGS. 1 and 2, the operation unit 20 is provided detachably with respect to the main body 10 of the MFP 1 as explained above. Therefore, when the operation unit 20 is attached to the MFP 1, the communication channel 30 functions as a wired communication channel and when the operation unit 20 is detached from the MFP 1, the communication channel 30 functions as a wireless communication channel.

The engine unit 17 is hardware that performs a processing, except for a versatile information processing and communication, for realizing at least two functions among the copying function, the scanner function, the facsimile function, and the printing function. For example, the engine unit 17 is provided with at least two devices among a scanner (image scanning unit) that scans and reads out an image of a document, a plotter (image forming unit) that performs printing onto a sheet member such as paper, a facsimile communication unit that performs a facsimile communication, and the like. The engine unit 17 may further be provided with special options such as a finisher that sorts printed sheet members and an ADF (Automatic Document Feeder) that automatically feeds a document.

Next, a hardware configuration of the operation unit 20 will be explained. As illustrated in FIG. 1, the operation unit 20 is provided with a CPU 21, a ROM 22, a RAM 23, a flash memory 24, a communication I/F 25, a connection I/F 26, and an operation panel 27, which are connected to each other via a system bus 28.

The CPU 21 centrally controls an operation of the operation unit 20. The CPU 21 uses the RAM 23 as a work area (work space) and executes programs stored in the ROM 22 or the flash memory 24 to control the entire operation of the operation unit 20. The CPU 21 then realizes various kinds of functions including a display and the like of information (image) depending on an input received from a user.

Besides, a Web browsing application program (Web browsing AP) is stored in a storage unit such as the ROM 22, for example. The CPU 21 executes the Web browsing AP to realize a Web browser 19, which will be explained later. The Web browser 19 performs a browsing operation and the like in cooperation with a Web application 39 stored in a storage unit such as the HDD 34 of the Web server device 37. The Web browser 19 may be stored in a storage (memory) area of another storage unit, such as the RAM 23 or the flash memory 24, not in the ROM 22; the Web application 39 may be stored in a storage (memory) area of another storage unit, such as the ROM 32 or the RAM 33, not in the HDD 34.

Besides, the Web browser 19 performs a control of transmitting, to a Web application of a specific Web server device 37, information such as a user ID, a serial number of the MFP, and a language set in the MFP, necessary for identifying a Web application that a user launches preferentially. Thus, a communication volume between the MFP 1 and the Web server device 37 is decreased and a Web application that the user desires is launched more quickly.

In this example, the Web browsing AP is configured to be stored in the ROM 22 and the like of the operation unit 20 of the MFP 1. However, the Web browsing AP may be stored in a storage unit, such as the ROM 12, the RAM 13, or the HDD 14 at the side of the main body 10 of the MFP 1, for example. In this case, the CPU 11 at the side of the main body 10 executes the Web browsing AP stored in the ROM 12 and the like to realize the Web browser 19 and launch the Web application that the user desires more quickly.

The communication I/F 25 is an interface that enables a communication with the Web server device 37 on the network 40, for example. The connection I/F 26 is an interface that enables a communication with the main body 10 via the communication channel 30.

The operation panel 27, which is an example of an operation unit and a display unit, is configured by an LCD (Liquid Crystal Display) device equipped with a touch sensor. The operation panel 27 receives inputs of various kinds appropriate to operations by a user and displays information of various kinds such as information appropriate to the received input, information indicating an operational status of the MFP 1, and information indicating a setting condition, for example. The operation panel 27 may be configured by an organic EL (Electro-Luminescence) display device equipped with a touch sensor. Moreover, the operation panel 27 may be provided with an operation unit such as a hardware key and a display unit such as a lamp in addition to or in place of this configuration.

Next, a hardware configuration of the Web server device 37 will be explained. As illustrated in FIG. 1, the Web server device 37 is provided with a CPU 31, a ROM 32, a RAM 33, an HDD 34, and a communication I/F 35, which are connected to each other via a system bus 38.

The Web application 39 is stored in a storage unit such as the HDD 34. The Web application 39 is executed by the CPU 31 and cooperates with the Web browser 19 of the MFP 1 to enable a browsing operation of the web browser 19 and a quicker launching control of the Web application desired by a user. Here, the Web application 39 may be downloaded from the Web server device 37 to the MFP 1 and the CPU 21 or the CPU 11 of the MFP 1 may execute the downloaded Web application 39.

Figure 2:
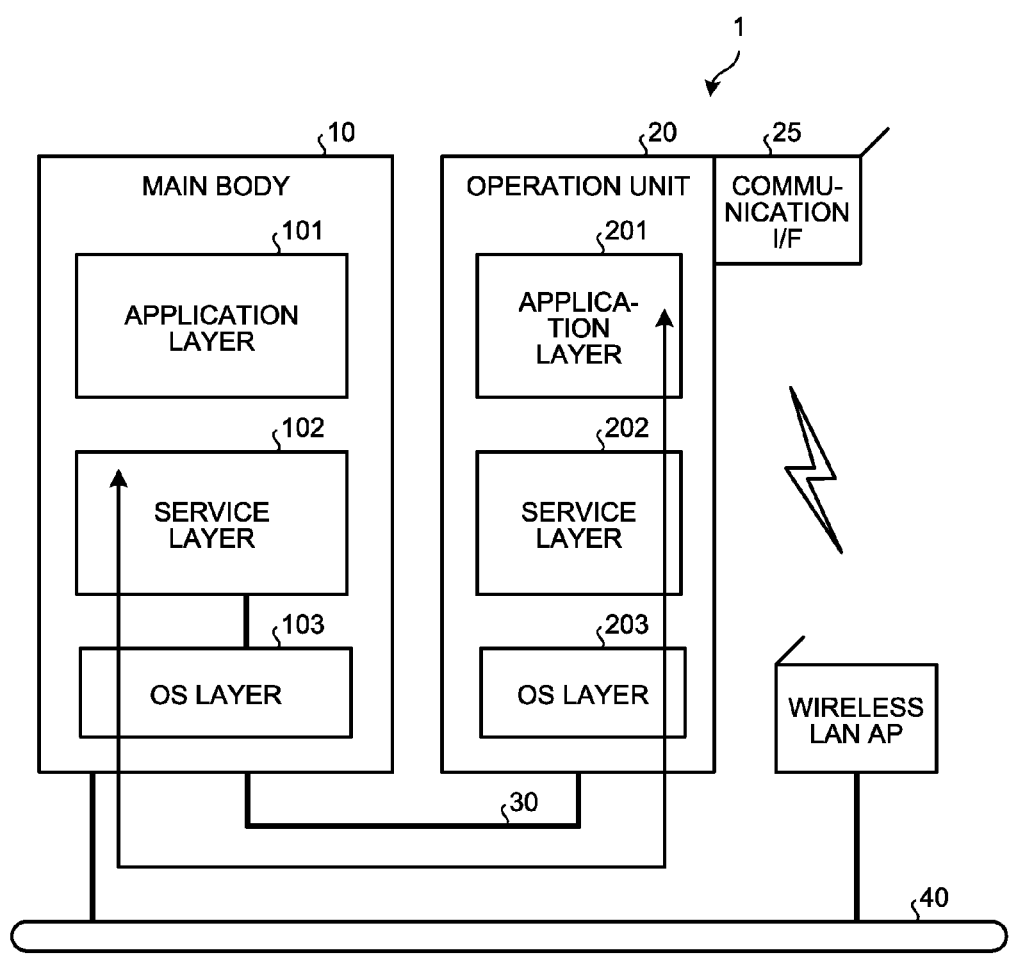
FIG. 2 is a schematic view of a software configuration of an MFP provided in the information processing system according to the embodiment.

Next, FIG. 2 illustrates an example of a software configuration of the MFP 1. As illustrated in FIG. 2, the main body 10 is provided with an application layer 101, a service layer 102, and an OS layer 103. The substances of the application layer 101, the service layer 102, and the OS layer 103 are various kinds of software stored in the ROM 12, the HDD 14, and the like. The CPU 11 executes the software, so that various kinds of functions are provided.

Software in the application layer 101 is application software (hereinafter sometimes referred to simply as "application" in the explanation below) for providing a predetermined function by operating a hardware resource. As such applications, a copy application that provides a copying function, a scanner application that provides a scanner function, a facsimile application that provides a facsimile function, and a printer application that provides a printing function can be listed, for example.

Software in the service layer 102, which intervenes between the application layer 101 and the OS layer 103, is software for providing, with respect to an application, an interface that enables using the hardware resource provided in the main body 10. Specifically, the service layer 102 is software for providing a function of receiving an operation request to the hardware resource and performing an arbitration of operation requests. Possible operation requests received by the service layer 102 include a request for scanning by a scanner and a request for printing by a plotter.

The interface function of the service layer 102 is provided not only to the application layer 101 of the main body 10 but also to an application layer 201 of the operation unit 20. In other words, the application layer 201 (application) of the operation unit 20 is also capable of realizing functions using the hardware resource (the engine unit 17, for example) of the main body 10 via the interface function of the service layer 102.

Software in the OS layer 103 is basic software (operating system) for providing a basic function of controlling the hardware provided in the main body 10. The software in the service layer 102 converts a request for using the hardware resource from various kinds of applications into a command which can be interpreted by the OS layer 103 and passes the command to the OS layer 103. The software in the OS layer 103 then executes the command, so that the hardware resource operates in accordance with the request from the applications.

Similarly, the operation unit 20 is provided with the application layer 201, a service layer 202, and an OS layer 203. The hierarchical structure of the application layer 201, the service layer 202, and the OS layer 203 of the operation unit 20 is the same as that of the main body 10. However, the functions provided by the applications in the application layer 201 and the kinds of the operation requests which can be received by the service layer 202 are different from those of the main body 10. An application in the application layer 201 is software that causes the hardware resource provided in the operation unit 20 to operate to provide a predetermined function. The software chiefly provides a function as a UI (User Interface) that allows an operation and a display about at least two of the functions, among the copying function, the scanner function, the facsimile function, and the printing function, provided in the main body 10.

To maintain independence in function in the example of the embodiment, the software in the OS layer 103 at the side of the main body 10 is different from the software in the OS layer 203 at the side of the operation unit 20. In other words, the main body 10 and the operation unit 20 independently operate with each other by separated operating systems. For example, Linux® may be used as the software in the OS layer 103 at the side of the main body 10 and Android® may be used as the software in the OS layer 203 at the side of the operation unit 20.

By causing the main body 10 and the operation unit 20 to operate by separated operating systems, the communication between the main body 10 and the operation unit 20 is performed not as an inter-process communication within a common device but as a communication between different devices. A transmission operation (command communication) of the input received by the operation unit 20 (a content instructed by a user) to the main body 10, an operation, by the main body 10, of notifying the operation unit 20 of an event, and the like fall under the communication between different devices. Here, the operation unit 20 is capable of using the functions of the main body 10 by performing the command communication with the main body 10. The event to be notified by the main body 10 to the operation unit 20 includes an execution status of the operation in the main body 10, a content which is set at the side of the main body 10, and the like.

While the power is supplied from the main body 10 to the operation unit 20 via the communication channel 30 in the example of the embodiment, it is possible to control the power source of the operation unit 20 separately (independently) from the control of the power source of the main body 10.

While the main body 10 and the operation unit 20 are electrically and physically connected via the communication channel 30 in this example, the operation unit 20 may be detachable from the main body 10 as explained above. In this case, a close-range wireless communication unit such as an infrared communication unit, an RF (Radio Frequency) communication unit, and the Bluetooth® communication unit is provided in the main body 10 and the operation unit 20, for example. Alternatively, a communication function of a wireless LAN (Local Area Network) such as Wi-Fi® may be provided in the main body 10 and the operation unit 20 to enable a mutual communication via a wireless LAN access point and the network 40 as illustrated in FIG. 2. In the case where the operation unit 20 is detachable from the main body 10, the operation unit 20 accumulates an electric power supplied from the main body 10 via the communication channel 30 in a secondary battery, and operates and communicates with the main body 10 by using the electric power accumulated in the secondary battery when detached from the main body 10.

Figure 3:
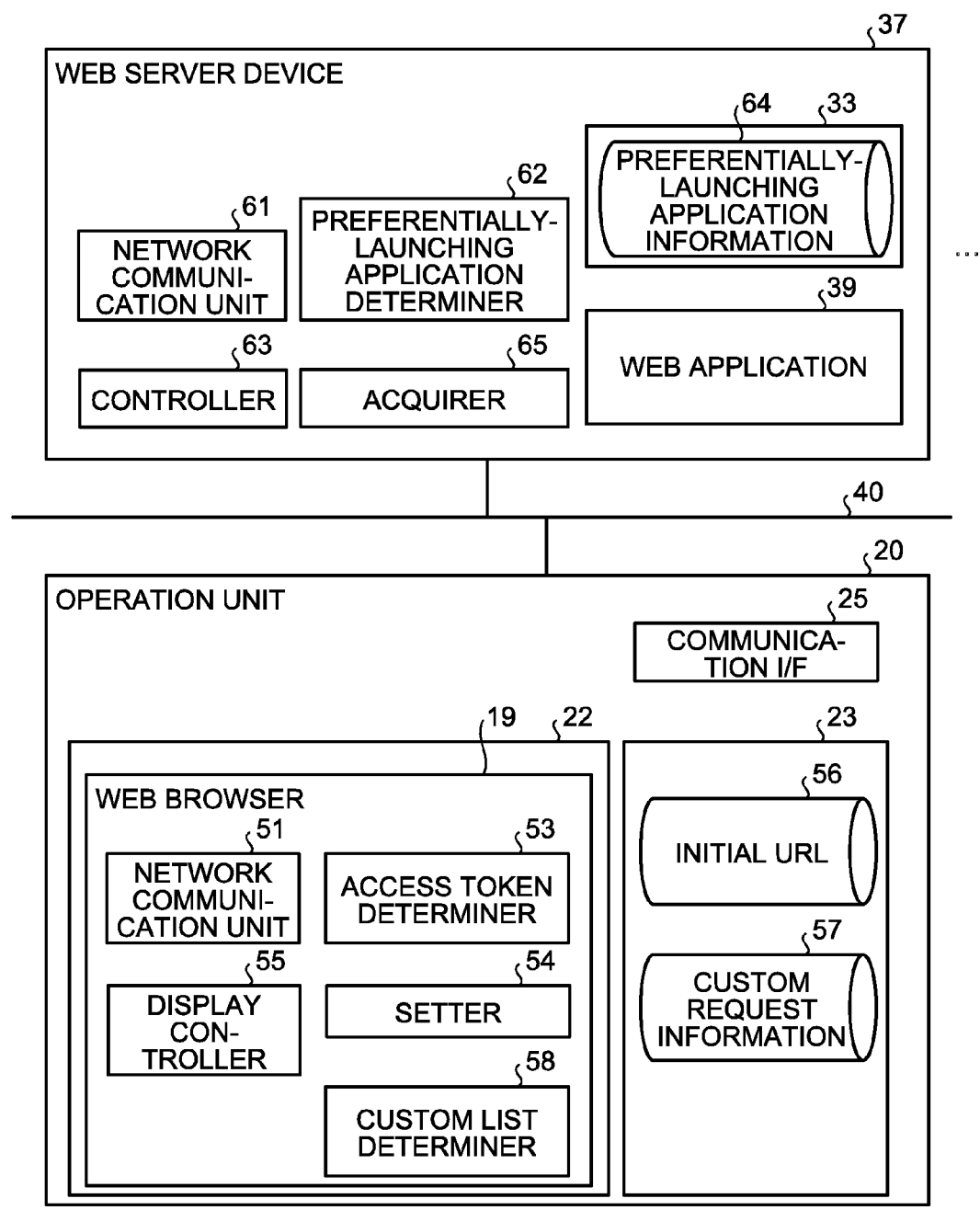
FIG. 3 is a functional block diagram of a Web browser and a Web application provided in the MFP in the information processing system according to the embodiment.

Next, FIG. 3 is a functional block diagram of the Web browser 19 that is realized when the CPU 21 of the operation unit 20 of the MFP 1 executes the Web browsing AP stored in the ROM 22. As illustrated in FIG. 3, the Web browser 19 is provided with a network communication unit 51, an access token determiner 53, a setter 54, a display controller 55, and a custom list determiner 58.

The network communication unit 51 transmits and receives a display content, setting information, and the like between the Web browser 19 and the Web application 39. The setting information includes a setting value. The access token determiner 53 decrypts an access token which is encrypted and obtained from the Web application 39 and performs a verification on whether or not the access token is valid. The access token (an example of user authenticating information) is, for example, information in which an ID (application ID) that uniquely identifies valid user identifying information, a password, and the Web application 39 and the like are encrypted. The setter 54 stores and updates custom request information 57 (an example of request information). The display controller 55 displays a display screen of the Web application 39 on the operation panel 27 which doubles as the display unit. The custom list determiner 58 identifies custom request information to be transmitted to the Web server device 37 depending on a URL (Uniform Resource Locator) and the like of the Web server device 37 as an access destination.

In the RAM 23, an initial URL 56 and the custom request information 57 used by the Web browser 19 are stored. The initial URL 56 is an URL of the Web server device 37 to access right after the start-up of the MFP 1. The custom request information 57, which is set by the Web server device 37 that is accessed right after the start-up of the MFP 1, is managed for each application ID as will be explained later.

While the network communication unit 51, the access token determiner 53, the setter 54, the display controller 55, and the custom list determiner 58 are assumed to be realized by software and explanation thereof will be put forward in this example, a part or all of the network communication unit 51, the access token determiner 53, the setter 54, the display controller 55, and the custom list determiner 58 may be realized by hardware such as an IC (Integrated Circuit).

Besides, the network communication unit 51, the access token determiner 53, the setter 54, the display controller 55, and the custom list determiner 58 of the Web browser 19 in FIG. 3 are illustrated on a conceptual basis in function and the present invention is not limited to the configuration. For example, a plurality of functional units illustrated as independent functional units in the Web browser 19 illustrated in FIG. 3 may be configured as one functional unit. In contrast, the function included in one functional unit in the Web browser 19 illustrated in FIG. 3 may be divided into and configured as a plurality of functional units.

Besides, the Web browsing AP may be provided by being recorded in a file of an installable format or of an executable format in a computer-readable recording medium such as a CD-ROM (Compact Disc Read Only Memory) and a flexible disk (FD). The Web browsing AP may be provided by being recorded in a computer-readable recording medium such as a CD-R (Compact Disk-Recordable), a DVD (Digital Versatile Disc), Blu-Ray Disc®, and a semiconductor memory. The Web browsing AP may be provided via a network such as the Internet. Moreover, the MFP 1 may download via the network, and install and execute the Web browsing AP in the operation unit 20 (or the main body 10). The Web browsing AP may be provided by being preloaded onto the ROM and the like inside the device.

Examples of the custom request information 57 is illustrated in FIGS. 4A and 4B. As illustrated in FIG. 4A, an URL indicating a location of the Web application, a serial number of the MFP 1, a language (display language) set in the MFP 1, a user ID, model information (model name) of the MFP 1, and the like are associated and included in the custom request information 57 for each application ID obtained from the access token. In the example illustrated in FIG. 4A, for example, an URL "http://domain/path", a serial number "M0001", a display language "Japanese", a user ID "UR0001", and a model name "S-Type" are associated and managed for an application ID "A0000001". It is thereby possible to manage the custom request information 57 for each of a plurality of Web applications each of which is identified by each application ID. Besides, as illustrated in FIG. 4B, information in which an application ID and a name of the Web application (application name) identified by the application ID are associated may also be included in the custom request information 57.

The Web browser 19 accesses the Web server device 37 for the setting of the custom request information 57 right after the start-up of the MFP 1. The Web application 39 obtains device setting information of the MFP 1 via the Web browser 19 and causes the Web browser 19 to store the custom request information 57 illustrated in FIG. 4.

Here, there is a possibility that the display language and a log-in user of the MFP 1 are changed in each time. Therefore, a reserved keyword is designated. The Web browser 19 performs a conversion into an appropriate value in making a request to the Web application 39.

Next, the CPU 31 of the Web server device 37 executes the program stored in the HDD 34 to realize a network communication unit 61, a preferentially-launching application determiner 62, a controller 63, and an acquirer 65 illustrated in FIG. 3. The CPU 31 also executes the Web application 39.

The network communication unit 61 transmits and receives data including a display content, setting information, and the like between the Web browser 19 and the Web application 39. The preferentially-launching application determiner 62 refers to the custom request information 57 transmitted from the Web browser 19 and determines a Web application that suits to a vendor who uses the MFP 1 and a user who logs-in to the MFP 1. The acquirer 65 requests the Web browser 19 to obtain device setting information to obtain the device setting information. The Web server device 37 stores preferentially-launching application information 64 for each user in the storage unit such as the RAM 33 and the HDD 34.

While the network communication unit 61, the preferentially-launching application determiner 62, the controller 63, and the acquirer 65 are assumed to be realized by software and explanation thereof will be put forward in this example, a part or all of the network communication unit 61, the preferentially-launching application determiner 62, the controller 63, and the acquirer 65 may be realized by hardware such as an IC.

Besides, the network communication unit 61, the preferentially-launching application determiner 62, the controller 63, and the acquirer 65 in FIG. 3 are illustrated on a conceptual basis in function and the present invention is not limited to the configuration. For example, a plurality of functional units illustrated as independent functional units in FIG. 3 may be configured as one functional unit. In contrast, the function included in one functional unit in FIG. 3 may be divided into and configured as a plurality of functional units.

Besides, the program of the Web server device 37 may be provided by being recorded in a file of an installable format or of an executable format in a computer-readable recording medium such as a CD-ROM and a flexible disk (FD). The program of the Web server device 37 may be provided by being recorded in a computer-readable recording medium such as a CD-R, a DVD, Blu-ray Disc®, and a semiconductor memory. The program of the Web server device 37 may be provided via a network such as the Internet. Moreover, the Web server device 37 may download via the network, and install and execute the program. The program of the Web server device 37 may be provided by being preloaded onto the ROM 32 and the like inside the device.

Figure 5:
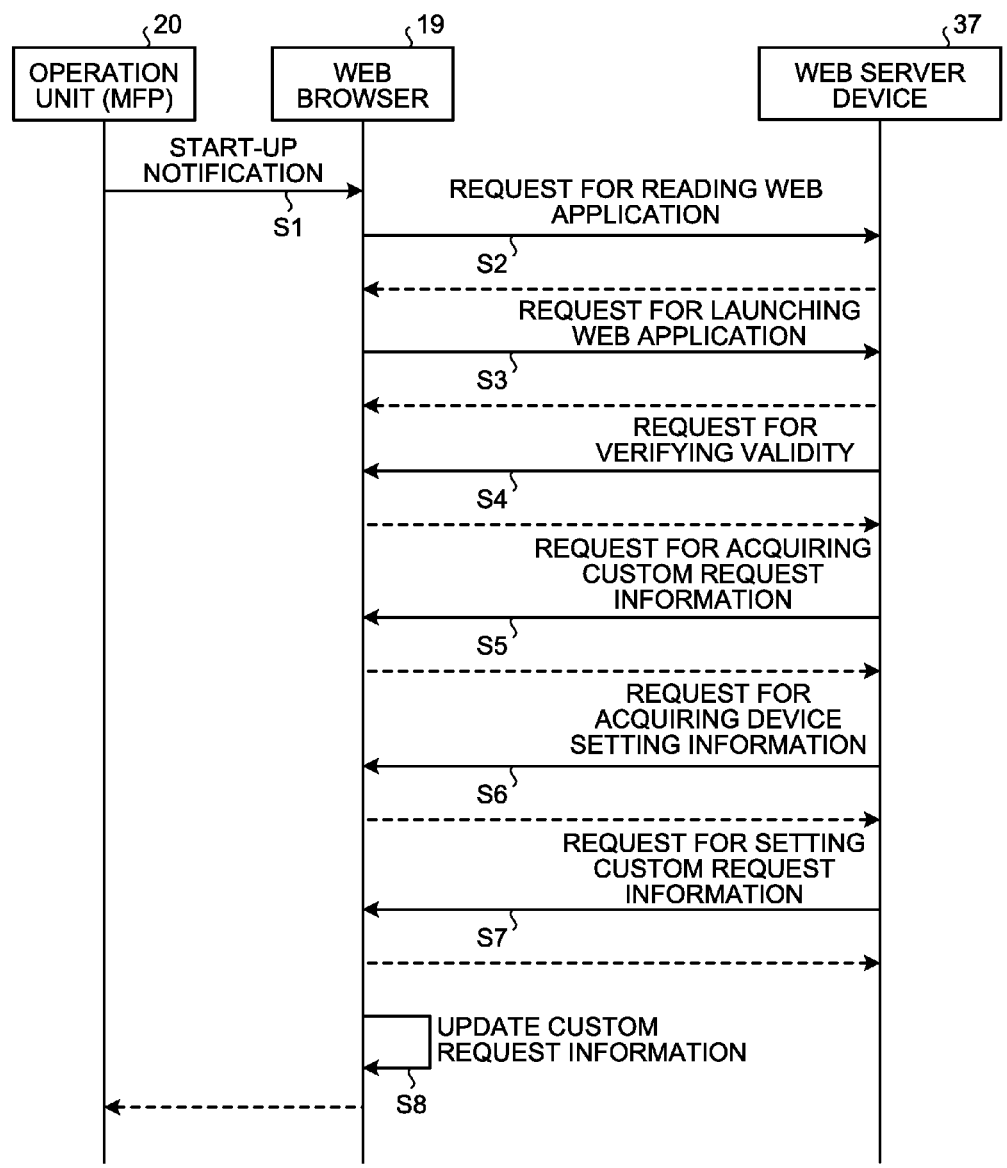
FIG. 5 is a sequence diagram illustrating a flow in which the Web application sets the custom request information by activating the Web browser right after the start-up of the MFP.

Next, a flow in which the Web browser 19 is activated right after the start-up of the MFP 1 and the Web server device 37 sets the custom request information 57 is illustrated in the sequence diagram of FIG. 5. Here, the operation illustrated in the sequence diagram of FIG. 5 is not limited to the execution right after the start-up of the MFP 1 and may be executed on the occasion of a log-in by a user or at a timing when an update of the custom request information 57 is necessary in operation by the user who has logged-in, for example.

First, the operation unit 20 notifies the Web browser 19 of the start-up at step S1 in FIG. 5. At step S2, the network communication unit 51 (an example of a requester) of the Web browser 19 requests the Web server device 37 of the URL indicated by the initial URL 56 to read the Web application 39. At step S3, the network communication unit 51 of the Web browser 19 makes a request for launching the Web application 39 in response to a response by the Web server device 37.

To obtain the device setting information of the MFP 1, the network communication unit 61 of the Web server device 37 passes the access token to make a request for validity verification at step S4. The access token determiner 53 (an example of a verifier) of the Web browser 19 decrypts the access token which is encrypted and passed from the network communication unit 61 to perform a verification on whether or not the access token is valid. On this occasion, the access token determiner 53 (an example of an acquirer and an example of a first acquirer) obtains an application ID (an example of identifying information) that uniquely identifies the Web application 39 included in the access token. When the access token determiner 53 determines that the validity verification is difficult, the Web browser 19 stops a subsequent processing.

Next, the acquirer 65 of the Web server device 37 requests the Web browser 19 to obtain the current custom request information 57 stored in the RAM 23 at step S5. The custom list determiner 58 of the Web browser 19 returns the current custom request information 57 which is associated with the application ID obtained at step S4 among the custom request information 57 illustrated in FIG. 4 to the Web application 39.

Next, the acquirer 65 (an example of a second acquirer) of the Web server device 37 requests the Web browser 19 to obtain the device setting information (an example of device information) at step S6. When obtaining the device setting information, the controller 63 of the Web server device 37 associates the Web application 39 whose launching is requested at step S3 with the obtained device setting information, and generates and stores in the RAM 33 the preferentially-launching application information 64.

Besides, when obtaining the device setting information, the network communication unit 61 of the Web server device 37 requests the Web browser 19 to set custom request information 57 in which a change content about the current custom request information 57 obtained at step S5 is updated at step S7. The setter 54 (an example of a storage controller) of the Web browser 19 stores in the RAM 23 (an example of the storage unit) or updates, by associating with the application ID obtained at step S4, the custom request information 57 together with domain information of the Web server device 37 at step S8.

Figure 6:
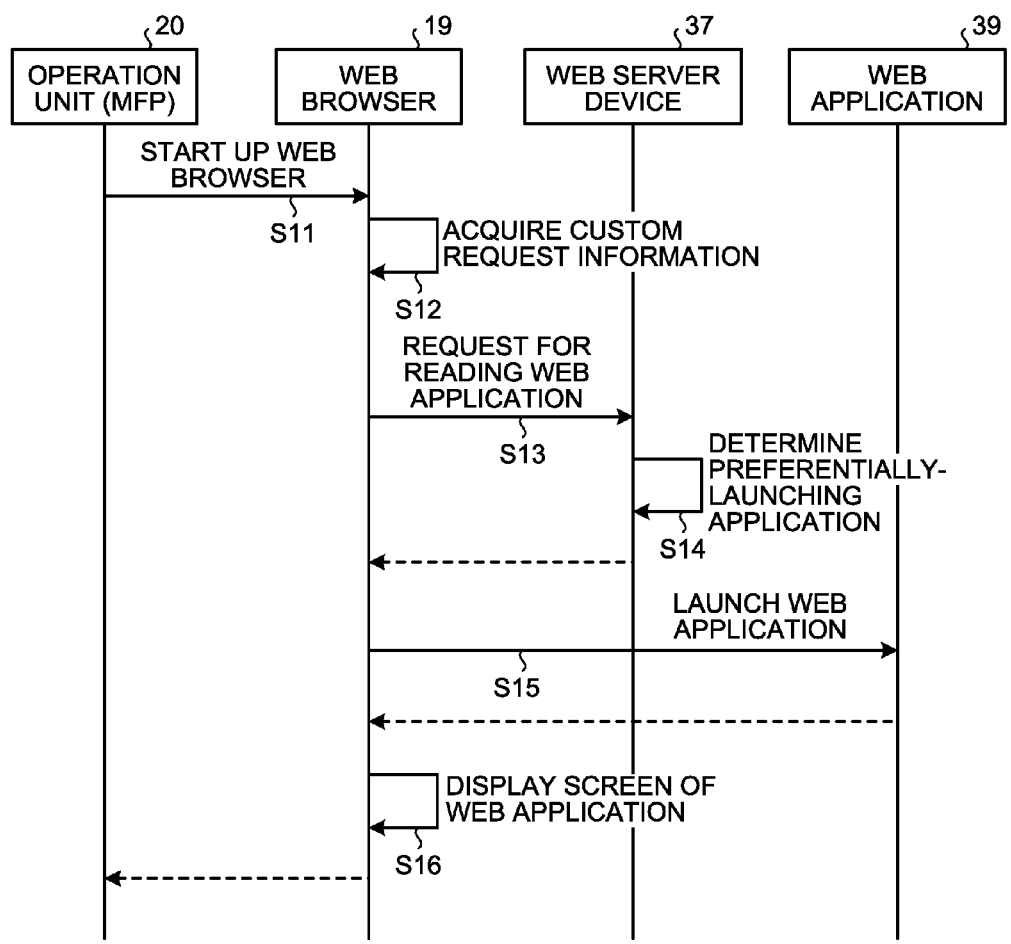
FIG. 6 is a sequence diagram illustrating a flow in which the Web browser determines and activates a Web application to activate preferentially.

Next, a flow in which the Web browser 19 determines and launches a Web application 39 to launch preferentially is illustrated in the sequence diagram of FIG. 6. First at step S11, the operation unit 20 launches the Web browser 19 in response to a user operation after the user log-in and the like as a trigger. At step S12, the custom list determiner 58 of the Web browser 19 refers to the setting of the initial URL 56 and obtains the custom request information 57 of the Web server device 37 indicated by the initial URL 56 among the plurality of Web server devices 37. The network communication unit 51 of the Web browser 19 then makes a reading request to the Web server device 37 at step S13.

The preferentially-launching application determiner 62 of the Web server device 37 compares the custom request information 57 transmitted from the Web browser 19 with the preferentially-launching application information 64 stored in the RAM 33 at step S14. The preferentially-launching application information 64 is built by associating the Web application 39 whose launching is requested and the device setting information. Therefore, the preferentially-launching application determiner 62 detects, from the preferentially-launching application information 64, the Web application 39 (preferentially-launching application) associated with the device setting information corresponding to the custom request information 57 transmitted from the Web browser 19.

The network communication unit 51 of the Web browser 19 makes a request for launching the preferentially-launching application detected in the Web server device 37 at step S15. Thus, the preferentially-launching application is launched in the Web server device 37. The display controller 55 (an example of an executor) of the Web browser 19 displays a screen of the launched preferentially-launching application on the operation panel 27 which doubles as the display unit at step S16. In a case where the custom request information 57 is not managed for each application ID that uniquely indicates the Web application 39 in contrast to FIG. 4A, there possibly occurs an undesirable situation with a possibility that the respective Web applications 39 of the plurality of Web server devices 37 refer to and update the same custom request information 57. Since the custom request information 57 is managed for each application ID as illustrated in FIG. 4A in the embodiment and each Web application 39 refers to and updates the custom request information 57 identified by its own application ID, it is possible to suppress the occurrence of such a situation as explained above.

Figure 7:
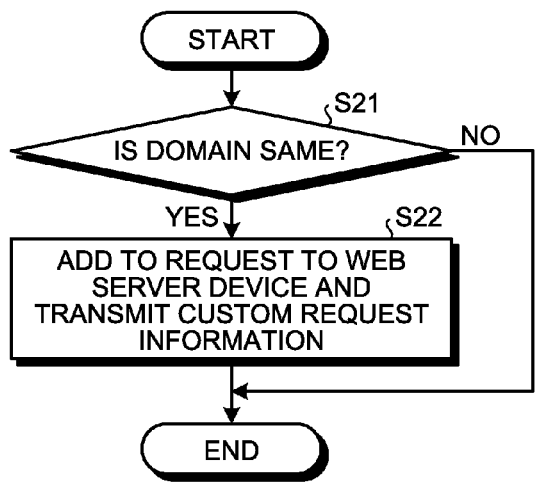
FIG. 7 is a flowchart illustrating a flow of a determination processing on whether or not to add the custom request information to a request when the Web browser accesses the Web server device.

An operation of selecting the Web application 39 to launch preferentially by using the custom request information 57 will be explained next with reference to FIGS. 7 and 8. FIG. 7 is a flowchart illustrating a flow of a determination processing on whether or not to add the custom request information 57 to a request when the Web browser 19 accesses the Web server device 37.

At step S21 in the flowchart of FIG. 7, the network communication unit 51 of the Web browser 19 determines whether or not the accessed Web server device 37 has the same domain as the Web server device 37 that sets the custom request information 57 each time when there is an access to any Web server device 37. When determining that the domain is not the same ("No" at step S21), the processing in the flowchart of FIG. 7 ends directly.

On the other hand, when determining that the domain is the same ("Yes" at step S21), the network communication unit 51 (an example of a second requester) of the Web browser 19 adds the custom request information 57 to the request to the Web server device 37 at step S22.

Figure 8:
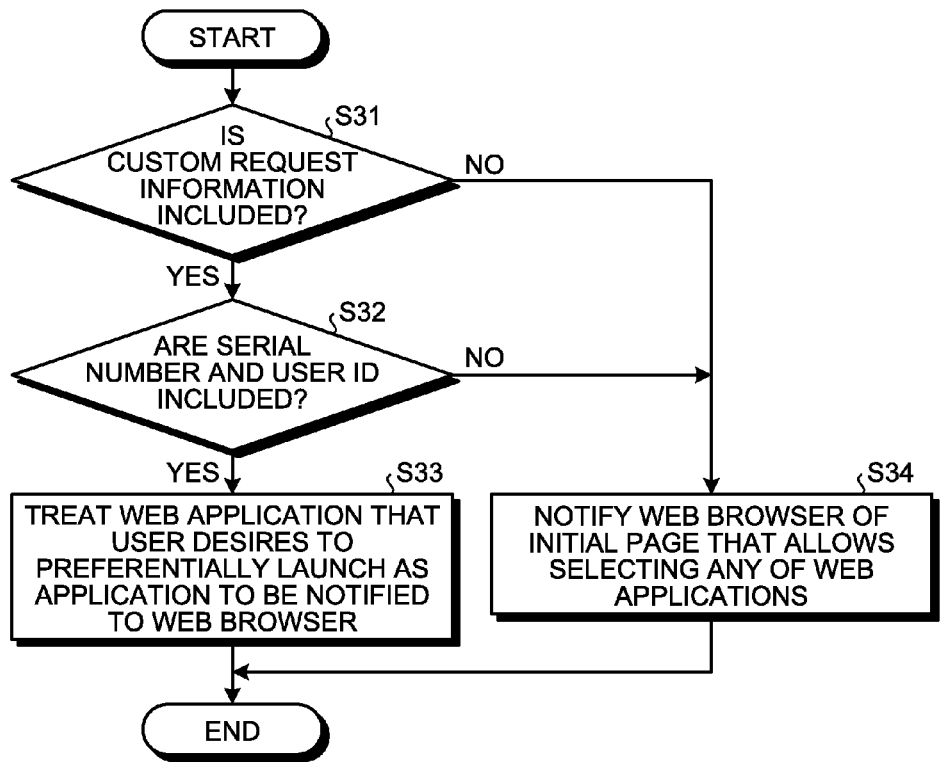
FIG. 8 is a flowchart illustrating a flow of a processing in which the Web server device receives the request from the Web browser, refers to the custom request information, and determines a Web application to activate preferentially.

Next, FIG. 8 is a flowchart illustrating a flow of a processing in which the Web server device 37 receives a request from the Web browser 19, refers to the custom request information 57, and determines a Web application 39 to launch preferentially. At step S31 in the flowchart of FIG. 8, the Web server device 37 determines whether or not the custom request information 57 is included in the request from the Web browser 19. When it is determined that the custom request information 57 is not included ("No" at step S31), the processing moves to step S34, the preferentially-launching application determiner 62 of the Web server device 37 notifies, via the network communication unit 61, the Web browser 19 of an initial page that allows selecting any of the plurality of Web applications, and the processing in the flowchart of FIG. 8 ends.

On the other hand, when it is determined that the custom request information 57 is included ("Yes" at step S31), the processing moves to step S32 and the preferentially-launching application determiner 62 of the Web server device 37 determines whether or not the serial number of the MFP 1 and the user ID that identify user information are included. When it is determined that the serial number of the MFP 1 and the user ID are not included ("No" at step S32), the processing moves to step S34, the preferentially-launching application determiner 62 of the Web server device 37 notifies, via the network communication unit 61, the Web browser 19 of the initial page that allows selecting any of the plurality of Web applications, and the processing in the flowchart of FIG. 8 ends.

On the other hand, when it is determined that the serial number of the MFP 1 and the user ID are included ("Yes" at step S32), the processing moves to step S33, the Web application 39 to launch preferentially is selected based on the user information identified at the side of the Web server device 37, and the processing in the flowchart of FIG. 8 ends.

Here, a control of changing a term or a design of the Web application 39 may be performed with reference to the display language of the MFP 1, in addition to the determination of the preferentially-launching application by using the custom request information 57. Besides, a model (type of equipment) of the MFP 1 may be identified by using the custom request information 57 and only a Web application corresponding to the identified model may be controlled to be displayed on the initial page.

As apparent from the explanation so far, the MFP 1 and the Web server device 37 are connected via the network 40 and the Web application 39 included in the Web server device 37 is used to utilize the functions of the MFP 1 in the information processing system 100 according to the embodiment. On this occasion, the Web server device 37 sets information necessary for identifying a Web application 39 desired by the user in advance in the MFP 1. Specifically, the MFP 1 transmits information, such as the user ID, the serial number of the MFP 1, and the language set in the MFP 1, necessary for identifying the Web application 39 that the user desires to launch preferentially.

The Web browser 19 accesses the Web server device 37 in the start-up of the MFP 1 and verifies the validity of the Web application 39 with the access token. The Web application 39 sets data which needs to be transmitted to itself. If the Web server device, when a user logs-in to the MFP 1 and accesses the Web server device 37 via the Web browser 19, has the same domain as the Web server device accessed in the start-up, the user ID, the serial number of the MFP 1, the language set in the MFP 1, the model information of the MFP 1, and the like, which are necessary for identifying the Web application desired by the user are added in a header of the request of the Web browser 19 and transmitted.

To put it another way, the Web browser 19 of the MFP 1 accesses the initial URL 56 right after the start-up of the MFP 1 and sets updated custom request information 57. In accessing the Web server device 37 from the Web browser 19 of the MFP 1 after that, the custom request information 57 is added in transmission.

It is thus possible, by one request from the Web browser 19 to the Web server device 37, to notify the specific Web server device 37 only of necessary information (it is possible to decrease the communication volume between the MFP 1 and the Web server device 37). Besides, it is possible to activate the Web application desired by the user more quickly. Moreover, it is possible to prevent an inconvenience of transmitting security information such as user information to many and unspecified Web server devices 37.

Furthermore, the custom request information 57 is configured to be managed for each application ID obtained from the access token as illustrated in FIG. 4A. Since the Web application 39 refers to and updates the custom request information 57 identified by its own application ID, it is thus possible to suppress an occurrence of the situation in which respective Web applications 39 of the plurality of Web server devices 37 refer to and update the same custom request information 57.

The MFP 1 according to the embodiment is an example of a device to which the present invention is applied, for example. Therefore, the present invention may be applied to devices, such as a projector, a teleconference system, and a digital camera device, other than the MFP 1.

While the operation unit 20 of the MFP 1 is configured to be detachable from the main body 10 in the embodiment, the operation unit 20 may be provided by being fixed to the main body 10 as a so-called operation panel. In other words, the operation unit 20 and the main body 10 may be integrally formed. It is possible to obtain the same advantages as explained above in this case, too.

According to the embodiment, there is an advantage of expediting an activation of a program desired by a user.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device comprising:
   a first requester configured to issue a request for launching a desired program to a server in which programs are stored on a network;
   an acquirer configured to acquire identifying information that is included in user authenticating information transmitted from the server in response to the launching request and identifies the desired program;
   a transmitter configured to transmit device information that identifies the device to the server in response to a transmission request transmitted from the server in response to the launching request;
   a storage controller configured to store, in association with the identifying information, request information including address information which allows accessing the server via the network and the device information transmitted to the server in a storage unit;
   a second requester configured to transmit the request information to the server via the network; and
   an executor configured to execute the desired program which is launched in the server and associated with the request information via the network.

2. The device according to claim 1, wherein the storage controller generates the request information at a time of a start-up of the device and stores the request information in the storage unit.

3. The device according to claim 1, further comprising:
   a verifier configured to verify a validity of the user authenticating information transmitted from the server, wherein
   the storage controller stores the request information in the storage unit when a verification result indicating the validity is obtained from the verifier.

4. The device according to claim 3, wherein the second requester transmits the request information to the same server indicated by the address information in transmitting, to the server, the request information stored in the storage unit based on the verification result indicating the validity.

5. The device according to claim 1, wherein the request information includes any one of identifying information of the device, a language set in the device, user identifying information, and a model of the device.

6. An information processing method comprising:
   issuing a request for launching a desired program to a server in which programs are stored on a network;

acquiring identifying information that is included in user authenticating information transmitted from the server in response to the launching request and identifies the desired program;

transmitting device information that identifies the device to the server in response to a transmission request transmitted from the server in response to the launching request;

storing, in association with the identifying information in a storage unit, request information including address information which allows accessing the server via the network and the device information transmitted to the server;

transmitting the request information to the server via the network; and executing the desired program which is activated in the server and associated with the request information via the network.

7. The information processing method according to claim 6, further comprising generating the request information to be stored in the storage unit at a time of a start-up of the device.

8. The information processing method according to claim 6, further comprising verifying a validity of the user authenticating information transmitted from the server, wherein
the storing includes storing the request information in the storage unit when a verification result indicating the validity is obtained at the verifying.

9. The information processing method according to claim 8, wherein the transmitting includes transmitting the request information to the same server indicated by the address information in transmitting, to the server, the request information stored in the storage unit based on the verification result indicating the validity.

10. The information processing method according to claim 6, wherein the request information includes any one of identifying information of the device, a language set in the device, user identifying information, and a model of the device.

11. An information processing system comprising:
a server configured to store programs; and
a device configured to execute a program stored in the server via a network,
the device including
a first requester configured to issue a request for launching a desired program to the server;
a first acquirer configured to acquire identifying information that is included in user authenticating information transmitted from the server in response to the launching request and identifies the desired program;
a transmitter configured to transmit device information that identifies the device to the server in response to a transmission request transmitted from the server in response to the launching request;
a first storage controller configured to store, in association with the identifying information, request information including address information which allows accessing the server via the network and the device information transmitted to the server in a first storage unit;
a second requester configured to transmit the request information to the server via the network; and
an executor configured to execute the desired program which is launched in the server and associated with the request information via the network, and
the server including
a second storage unit configured to store the program;
a second acquirer configured to acquire the device information from the device in response to the launching request;
a second storage controller configured to store the requested program and the acquired device information in association with each other in the second storage unit; and
a launching controller configured to detect, from the second storage unit, the program corresponding to the device information included in the request information received from the device, and launch the program.

12. The information processing system according to claim 11, wherein the first storage controller generates the request information at a time of a start-up of the device and stores the request information in the first storage unit.

13. The information processing system according to claim 11, wherein
the device further includes a verifier configured to verify a validity of the user authenticating information transmitted from the server, and
the first storage controller stores the request information in the first storage unit when a verification result indicating the validity is obtained from the verifier.

14. The information processing system according to claim 13, wherein the second requester transmits the request information to the same server indicated by the address information in transmitting, to the server, the request information stored in the first storage unit based on the verification result indicating the validity.

15. The information processing system according to claim 11, wherein the request information includes any one of identifying information of the device, a language set in the device, user identifying information, and a model of the device.

* * * * *